United States Patent
Wu

(10) Patent No.: US 10,146,259 B1
(45) Date of Patent: Dec. 4, 2018

(54) DUAL-SCREEN ELECTRONIC DEVICE

(71) Applicants: Fu Tai Hua Industry (Shenzhen) Co., Ltd., Shenzhen (CN); HON HAI PRECISION INDUSTRY CO., LTD., New Taipei (TW)

(72) Inventor: Wen-Bing Wu, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 15/859,746

(22) Filed: Jan. 2, 2018

(30) Foreign Application Priority Data

Aug. 17, 2017 (CN) .......................... 2017 1 0707538

(51) Int. Cl.
G06F 1/16 (2006.01)

(52) U.S. Cl.
CPC .......... *G06F 1/1647* (2013.01); *G06F 1/1677* (2013.01); *G06F 1/1681* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,127,776 B2* | 10/2006 | Park | ....................... | G06F 1/1616 16/239 |
| 7,221,330 B2* | 5/2007 | Finke-Anlauff | ...... | G06F 1/1616 345/1.1 |
| 7,855,879 B2* | 12/2010 | Kim | ....................... | G06F 1/1601 361/679.21 |
| 7,917,993 B2* | 4/2011 | Park | ....................... | G06F 1/1616 16/235 |
| 8,621,716 B2* | 1/2014 | Chen | ..................... | G06F 1/1679 16/319 |
| 8,744,538 B2* | 6/2014 | Carmonius | ........... | G06F 1/1624 379/433.12 |
| 8,955,196 B2* | 2/2015 | Bai | ........................ | E05D 7/0415 16/367 |
| 9,176,537 B2* | 11/2015 | Sharma | .................. | G06F 1/1669 |
| 9,477,269 B2* | 10/2016 | Morrison | ............... | G06F 1/1681 |
| 2010/0298032 A1* | 11/2010 | Lee | ........................ | G06F 1/1616 455/566 |
| 2011/0012858 A1* | 1/2011 | Brookes | .................. | G06F 1/162 345/173 |
| 2012/0086658 A1* | 4/2012 | Moradian | ............. | G06F 1/1641 345/173 |

(Continued)

FOREIGN PATENT DOCUMENTS

WO  WO 2014187149 A1 *  11/2014  ........... G06F 1/1616

*Primary Examiner* — Lisa Lea Edmonds
(74) *Attorney, Agent, or Firm* — ScienBiziP, P.C.

(57) ABSTRACT

A dual-screen electronic device includes a first display module, a second display module, and at least one connector. The first display module is rotatably connected with the second display module by the at least one connector to enable the dual-screen electronic device to switch between an opened state and a closed state. In the opened state, the first screen and the second screen are in a single plane to cooperatively form an extended screen. In the closed state, the first display module and the second display module are folded together, and the first screen laminates to the second screen.

12 Claims, 5 Drawing Sheets

(56) References Cited

U.S. PATENT DOCUMENTS

| | | | | |
|---|---|---|---|---|
| 2012/0105363 A1* | 5/2012 | Sirpal | ............... | G06F 1/1616 345/174 |
| 2012/0307423 A1* | 12/2012 | Bohn | ............... | G06F 1/1641 361/679.01 |
| 2013/0135837 A1* | 5/2013 | Kemppinen | ........ | H04M 1/0235 361/807 |
| 2014/0101578 A1* | 4/2014 | Kwak | ............... | G06F 3/017 715/761 |
| 2014/0285960 A1* | 9/2014 | Sharma | ............ | G06F 1/1654 361/679.28 |
| 2016/0091924 A1* | 3/2016 | Aoki | ............ | F16M 11/2007 361/679.09 |
| 2016/0091935 A1* | 3/2016 | Sharma | ............ | G06F 1/1654 361/679.12 |
| 2017/0052698 A1* | 2/2017 | Seo | ............ | G06F 1/1641 |
| 2017/0356225 A1* | 12/2017 | Maatta | ............ | E05D 1/04 |

\* cited by examiner

DUAL-SCREEN ELECTRONIC DEVICE

CROSS-REFERENCE TO RELATED APPLICATIONS

This application claims priority to Chinese Patent Application No. 201710707538.X filed on Aug. 17, 2017, the contents of which are incorporated by reference herein.

FIELD

The subject matter herein generally relates to displays by electronic devices, particularly to a dual-screen electronic device.

BACKGROUND

Displays of portable electronic devices such as mobile phones, personal digital assistants (PDA) and laptop computers, can be enlarged, such that the portable electronic devices can display images more clearly. However, the context of an enlarged image in a traditional small display can thereby be lost.

BRIEF DESCRIPTION OF THE DRAWINGS

Implementations of the present technology will now be described, by way of example only, with reference to the attached figures.

DETAILED DESCRIPTION

Figure 1:
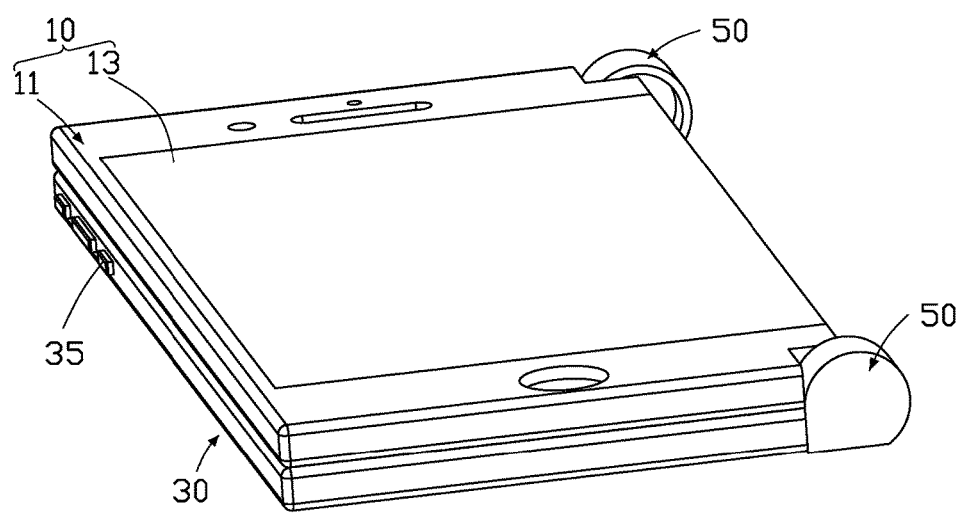
FIG. 1 is a diagrammatic view of an exemplary embodiment of a dual-screen electronic device, in a closed state.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "comprising" when utilized, means "including, but not necessarily limited to"; it specifically indicates open-ended inclusion or membership in the so-described combination, group, series, and the like.

FIG. 1 illustrates an exemplary embodiment of a dual-screen electronic device 100. The dual-screen electronic device 100 includes a first display module 10, a second display module 30, and at least one connector 50. The first display module 10 is rotatably connected with the second display module 30 by the at least one connector 50 to fold or open. The dual-screen electronic device 100 is switchable between an opened state and a closed state. The first display module 10 is electrically connected to the second display module 30.

In at least one exemplary embodiment, the dual-screen electronic device 100 includes two connectors 50.

Figure 2:
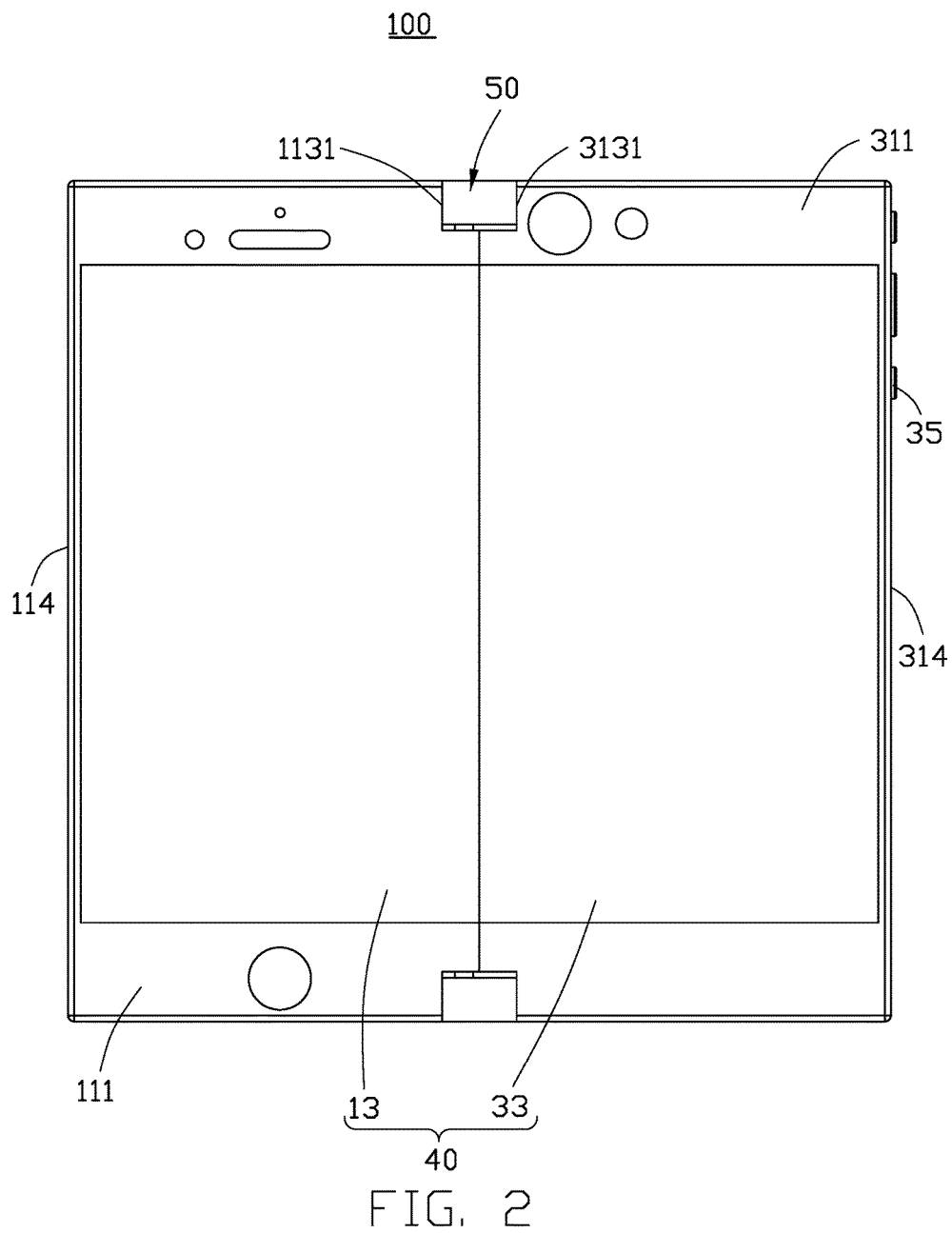
FIG. 2 is a diagrammatic view of the dual-screen electronic device in an opened state.
Figure 3:
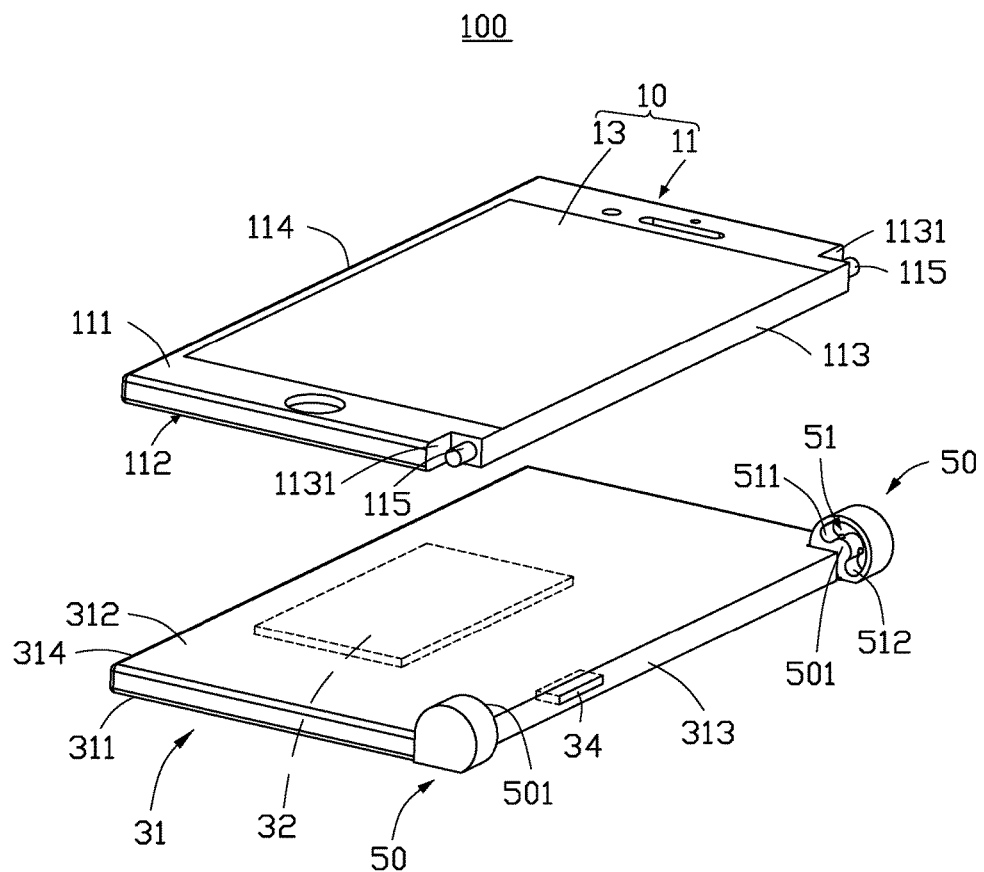
FIG. 3 is an exploded, diagrammatic view of the dual-screen electronic device.

Referring to FIGS. 2 and 3, the first display module 10 includes a first housing 11 and a first screen 13 mounted on the first housing 11. In at least one exemplary embodiment, the first housing 11 may be cuboid.

The first housing 11 includes a first surface 111, a second surface 112 facing away from the first surface 111, a first side 113, and a second side 114 facing away from the first side 113. The first side 113 and the second side 114 are connected with the first surface 111 and the second surface 112.

Two connecting shafts 115 protrude from the first housing 11 in opposite directions parallel to the first surface 111 and the first side 113.

In at least one exemplary embodiment, end portions of the first side 113 are recessed toward the second side 114 to form a first groove 1131 at each end portion. The two connecting shafts 115 protrude from the two first grooves 1131.

The first screen 13 is mounted on the first surface 111. In at least one exemplary embodiment, the first screen 13 is aligned with the first side 113.

The second display module 30 includes a second housing 31, a circuit board 32, and a second screen 33. The second housing 31 includes a first mounting surface 311, a second mounting surface 312 facing away from the first mounting surface 311, a first connecting surface 313, and a second connecting surface 314 facing away from the first connecting surface 313. The first connecting surface 313 and the second connecting surface 314 are connected with the first mounting surface 311 and the second mounting surface 312. The circuit board 32 is received in the second housing 31.

The second screen 33 is mounted on the first mounting surface 311, and electrically connected to the circuit board 32. In at least one exemplary embodiment, the second screen 33 is aligned with the first connecting surface 313. The second screen 33 is similar to the first screen 13 in shape and size.

In at least one exemplary embodiment, the second housing 31 is similar to the first housing 11 in shape and size.

The two connectors 50 are fixed on a side of the second housing 31 adjacent to the first connecting surface 313. In at least one exemplary embodiment, two end portions of the first connecting surface 313 are recessed toward the second connecting surface 314 to form a second groove 3131 at each end portion, to receive the two connectors 50.

Figure 4:
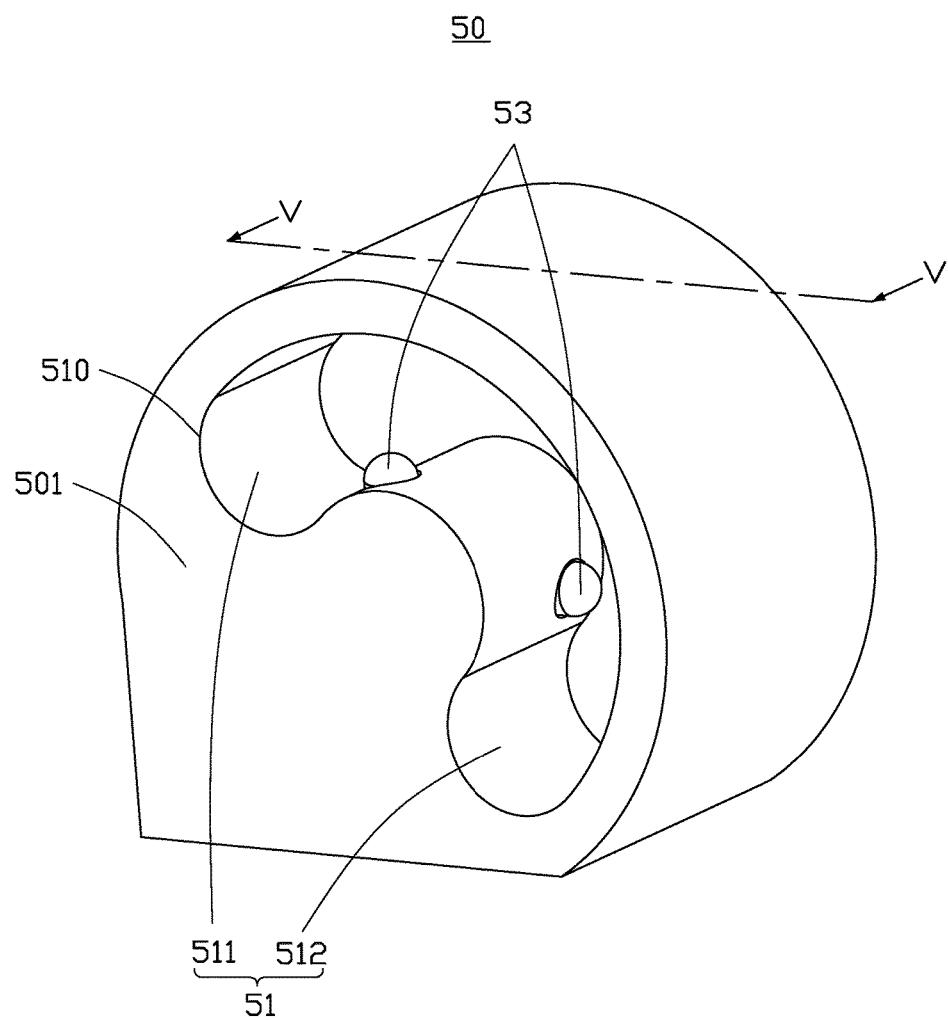
FIG. 4 is a diagrammatic view of an exemplary embodiment of a connector used in the dual-screen electronic device.

Referring to FIGS. 3 and 4, an arc groove 51 is defined on an installing surface 501 of each connector 50, and two installing surfaces 501 of the two connectors 50 are arranged face to face. The connecting shaft 115 is received in the arc groove 51, and slides along the arc groove 51. The arc groove 51 includes a first end portion 511 located at a side of the second mounting surface 312 away from the first mounting surface 311, and a second end portion 512 located at a side of the first connecting surface 313 away from the second connecting surface 314.

When the two connecting shafts 115 are located at the first end portions 511 of the two connectors 50, the first display module 10 and the second display module 30 are folded together, to cause the first screen 13 to laminate to the second screen 33. That is, the dual-screen electronic device 100 is in the closed state. When the two connecting shafts 115 are located at the second end portions 512 of the two connectors 50, the first display module 10 and the second display module 30 are opened, to cause the first screen 13 and the second screen 33 to be in a single plane and cooperatively form an extended screen 40. That is, the dual-screen electronic device 100 is in the opened state.

When a distance from an axis of each connecting shaft 115 to the first side 113 is equal to a radius of curvature of an arc formed by the axis of the connecting shaft 115 sliding along the arc groove 51, the first screen 13 and the second screen 33 are in a single plane and cooperatively form the extended screen 40 seamlessly in the opened state.

In at least one exemplary embodiment, each connector 50 may include two elastic stop parts 53 formed on an inner surface 510 of the arc groove 51. One of the two elastic stop parts 53 is formed to be adjacent to the first end portion 511 to fix the connecting shaft 115 when in the closed state. The other is formed to be adjacent to the second end portion 512 to fix the connecting shaft 115 when in the opened state. In this exemplary embodiment, each elastic stop part 53 is an elastomer.

Figure 5:
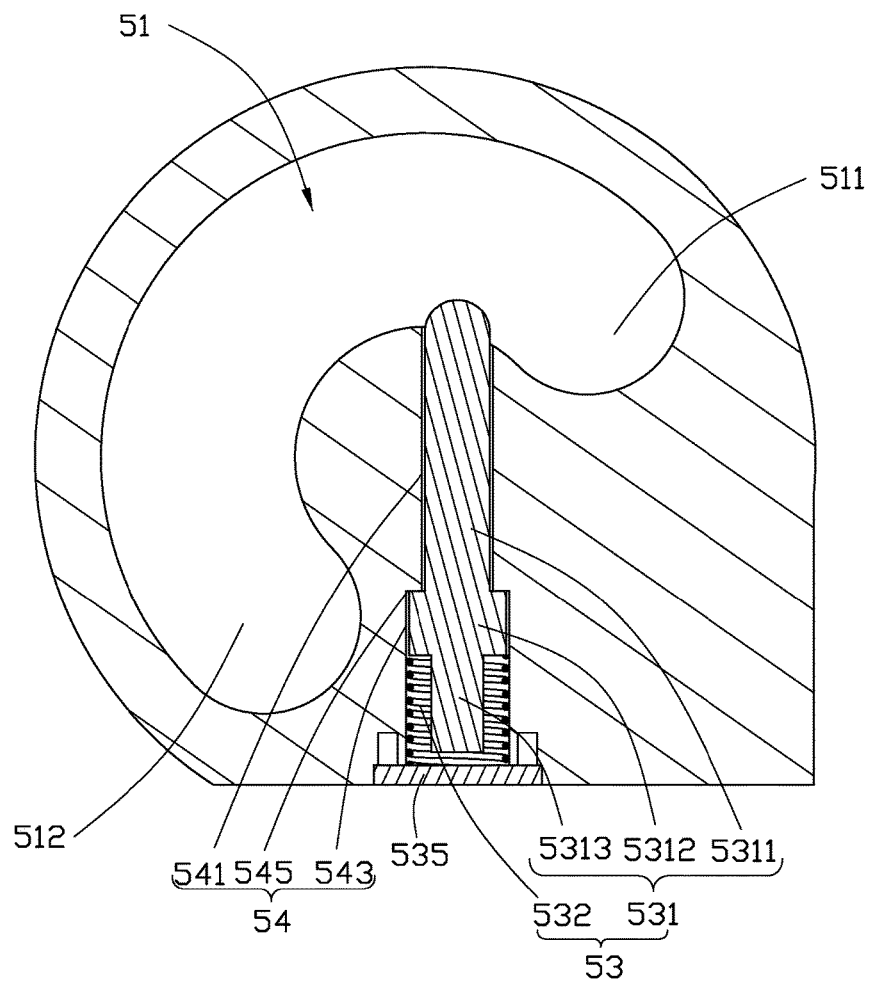
FIG. 5 is a cross-sectional view of the connector taken along V-V line of FIG. 4.

In at least one exemplary embodiment, referring to FIG. 5, at least one elastic stop part 53 is an elastic assembly received in the connector 50, and includes a pin 531 and a spring 532. The pin 531 includes a third end portion 5311 exposed out of the inner surface 510 and a fourth end portion 5313 away from the third end portion 5311. The spring 532 is sleeved on the fourth end portion 5313.

Two holes 54 are defined through each connector 50 to communicate with the arc groove 51 and environment. One of the two holes 54 is defined to be adjacent to the first end portion 511, the other is defined to be adjacent to the second end portion 512. In at least one exemplary embodiment, each hole 54 is a stepped hole, and includes a first chamber 541 and a second chamber 543 communicating with the first chamber 541. The first chamber 541 communicates with the arc groove 51. A diameter of the first chamber 541 is less than a diameter of the second chamber 543, thereby forming a step 545.

The pin 531 further includes a connecting portion 5312 connecting the third end portion 5311 and the fourth end portion 5313. A diameter of the connecting portion 5312 is larger than a diameter of the third end portion 5311 and a diameter of the fourth end portion 5313. Each pin 531 is received in one hole 54, the connecting portion 5312 and the fourth end portion 5313 are received in the second chamber 543, and the third end portion 5311 is received in the first chamber 541. The diameter of the connecting portion 5312 is larger than the diameter of the first chamber 541. The third end portion 5311 slides in the first chamber 541 and the second chamber 543. The spring 532 sleeved on the fourth end portion 5313 elastically resists the connecting portion 5312 and a fixed part 535. The fixed part 535 is mounted on the connector 50.

One of the first screen 13 and the second screen 33 is a main screen, the other one is an auxiliary screen. In this exemplary embodiment, the first screen 13 is the main screen, the second screen 33 is the auxiliary screen. That is, when in the closed state, the first screen 13 is used to display. When in the opened state, the first screen 13 and the second screen 33 are used to display at the same time.

In at least one exemplary embodiment, the dual-screen electronic device 100 may further include a sensor 34 electrically connected to the circuit board 32. The sensor 34 senses the dual-screen electronic device 100 being in the opened state or not. The sensor 34 generates an inductive signal when in the opened state, and transmits the inductive signal to the circuit board 32. A display interface of the dual-screen electronic device 100 is extended and shown on the first screen 13 and the second screen 33 at the same time when the circuit board 32 obtains the inductive signal.

In at least one exemplary embodiment, the sensor 34 is a light sensor. The sensor 34 is embedded in the first side 113 or the first connecting surface 313. In illustrated exemplary embodiment, the sensor 34 is embedded in the first connecting surface 313 to sense an intensity of light. When the dual-screen electronic device 100 is in the opened state, the first side 113 and the first connecting surface 313 are laminated to each other closely, the sensor 34 cannot sense light. The inductive signal is generated and transmitted to the circuit board 32 when no light can be sensed by the sensor 34.

In another exemplary embodiment, the dual-screen electronic device 100 may further include a button 35 used to generate a trigger signal when be pressed by a user. The button 35 may work in combination with the sensor 34. The display interface of the dual-screen electronic device 100 will extend and be shown on the first screen 13 and the second screen 33 at the same time when the circuit board 32 obtains the inductive signal from the sensor 34, together with the button 35 pressed by the user. If the circuit board 32 does not obtain the inductive signal, the display interface cannot be extended by a user pressing the button 35.

It is to be understood, even though information and advantages of the present embodiments have been set forth in the foregoing description, together with details of the structures and functions of the present embodiments, the disclosure is illustrative only. Changes may be made in detail, especially in matters of shape, size, and arrangement of parts within the principles of the present embodiments to the full extent indicated by the plain meaning of the terms in which the appended claims are expressed.

What is claimed is:

1. A dual-screen electronic device comprising:
a first display module comprising a first housing and a first screen mounted on the first housing;
a second display module comprising a second housing and a second screen; and
at least one connector;
wherein the first display module is rotatably connected with the second display module by the at least one connector, to cause the dual-screen electronic device is switchable between an opened state and a closed state; the opened state is that the first display module and the second display module are opened, and the first screen and the second screen are in a single plane to cooperatively form an extended screen; the closed state is that the first display module and the second display module are folded together, and the first screen laminates to the second screen; the at least one connector is fixed on a side of the second housing; an arc groove is defined on each connector, and has two end portions opposite to each other; one connecting shaft corresponding to each arc groove protrudes from the first housing, and the connecting shaft is slidably received in the arc groove; when the connecting shaft is located at one of the two end portions, the dual-screen electronic device is in the opened state or in the closed state.

2. The dual-screen electronic device of the claim 1, wherein the second housing comprises a first mounting surface, a second mounting surface facing away from the first mounting surface, a first connecting surface, and a second connecting surface facing away from the first connecting surface; the first connecting surface and the second connecting surface are connected with the first mounting surface and the second mounting surface, the second screen is mounted on the first mounting surface; the at least one connector is fixed on a side of the second housing adjacent to the first connecting surface; the arc groove comprises a first end portion located at a side of the second mounting surface away from the first mounting surface, and a second end portion located at a side of the first connecting surface away from the second connecting surface; the connecting shaft protrudes from the first housing parallel to the first connecting surface; when the connecting shaft is located at the first end portion, the dual-screen electronic device is in the closed state, and when the connecting shaft is located at the second end portion, the dual-screen electronic device is in the opened state.

3. The dual-screen electronic device of the claim 2, wherein the first screen and the second screen each is aligned with the first connecting surface.

4. The dual-screen electronic device of the claim 3, wherein the first housing comprises a first surface, a second surface facing away from the first surface, a first side and a second side facing away from the first side; the first side and the second side are connected with the first surface and the second surface; when a distance from an axis of each connecting shaft to the first side, is equal to a radius of curvature of an arc formed by the axis of the connecting shaft sliding along the arc groove, the first screen and the second screen to be in a single plane and cooperatively form an extended screen seamlessly in the opened state.

5. The dual-screen electronic device of the claim 1, wherein each connector comprises two elastic stop parts formed on an inner surface of the arc groove, one of the two elastic stop parts is adjacent to the first end portion to fix the connecting shaft when in the closed state, and the other is adjacent to the second end to fix the connecting shaft when in the opened state.

6. The dual-screen electronic device of the claim 5, wherein each elastic stop part is an elastomer, and the elastomer is fixed on the inner surface.

7. The dual-screen electronic device of the claim 5, wherein each elastic stop part is an elastic assembly received in the connector, and comprises a pin and a spring; the pin comprises a third end portion exposed out of the inner surface and a fourth end portion away from the third end portion, the spring is sleeved on the fourth end portion.

8. The dual-screen electronic device of the claim 5, wherein one of the two elastic stop parts is an elastomer, and the elastomer is fixed on the inner surface, the other is an elastic assembly received in the connector, and the elastic assembly comprises a pin and a spring; the pin comprises a third end portion exposed out of the inner surface and a fourth end portion away from the third end portion, the spring is sleeved on the fourth end portion.

9. The dual-screen electronic device of the claim 1, further comprising a sensor sensing the dual-screen electronic device being in the opened state or not, and generating an inductive signal when in the opened state to control the first screen and the second screen to show at a same time.

10. The dual-screen electronic device of the claim 9, the sensor is a light sensor.

11. The dual-screen electronic device of the claim 1, further comprising a sensor sensing the dual-screen electronic device being in the opened state or not, and generating an inductive signal when in the opened state; the dual-screen electronic device further comprising a button configured to generate a trigger signal when be pressed by a user, the first screen and the second screen showing at a same time when the inductive signal and the trigger signal coexist.

12. The dual-screen electronic device of the claim 11, the sensor is a light sensor.

\* \* \* \* \*